Sept. 29, 1959     O. BINDING     2,906,074
APPARATUS FOR PACKAGING OF PLASTIC SUBSTANCES OR LIQUIDS
Filed Jan. 28, 1957
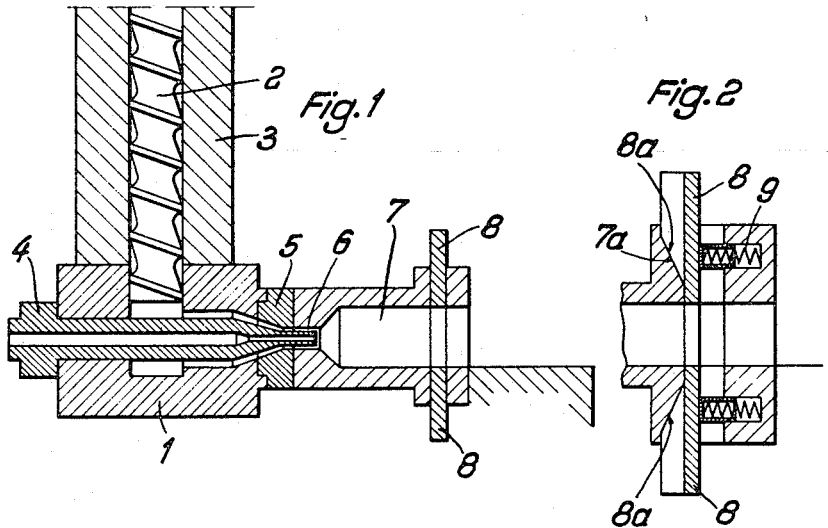
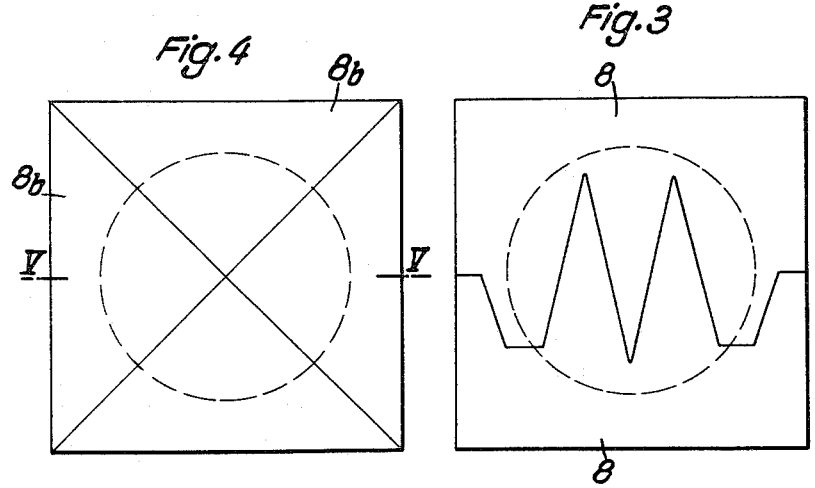
INVENTOR.
OTTO BINDING
BY
ATTORNEY

United States Patent Office 2,906,074
Patented Sept. 29, 1959

2,906,074
APPARATUS FOR PACKAGING OF PLASTIC SUBSTANCES OR LIQUIDS

Otto Binding, Eltville, Germany

Application January 28, 1957, Serial No. 636,578

5 Claims. (Cl. 53—140)

The invention relates to the packaging or filling of plastic substances or liquids into sections of thermoplastic tubing. This type of packaging or filling is widely used. Heretofore, it has been the general practice to, fill plastic substances or liquids into prefabricated thermoplastic tubes and, subsequently, to divide the filled tubes into sections by means of partition seams that are electrically sealed. This sectioning is, at the same time, used for measuring the respective amounts of the filling.

The purpose of the invention is to improve and facilitate packaging and filling in that the filling substance is fed simultaneously with the manufacture of the plastic tube, thereby eliminating both an intermediate storage of prefabricated plastic tubes and the difficult handling of such tubes during the subsequent filling process.

The invention therefore provides that filling should preferably take place simultaneously with the manufacture of the plastic tube on an extrusion press by introducing the filling substance by means of a centrally located nozzle, and that the filled tube should be sectioned immediately after filling.

Since this procedure requires feeding the filling substance under a predetermined pressure, a pressure should preferably be chosen that is high enough to be utilized for expanding the thermoplastic tube. In accordance with the invention therefore, the tube should preferably be manufactured with a small diameter, and subsequently expanded by means of feeding the filling substance thereinto under pressure, the advantage being that the dimensions of the extrusion press can be kept relatively small.

Since the sectioning of the filled tube by means of sealing electrodes takes but little time, the seams can be made during the continuous flow of the tube. In the event of a rapid flow, however, or with delicate tubing materials, it may be advisable to avoid any obstruction of the flow by sealing electrodes.

In further development of the invention, this can be effectuated by manufacturing the tube and introducing the filling substance in a pulsating rhythm, or intermittently, so that the filled tube can be sectioned during such intermissions. Another alternative is the manufacture of the tube and feeding the filling substance thereinto in a continuous flow with the sectioning tools continuously moving at the same rate and in the same direction as the tube during the sectioning process.

In view of the rapid filling process and a possibly rapid expansion of the plastic tube, the introduction of the filling substance can be adjusted to circumstances, according to the nature of the substance. The possibility of employing pressure was mentioned earlier on. Over and above that, there is a wide range of possible temperatures that may be selected. Liquids containing carbon dioxide, for example, will be introduced when relatively cold or even subcooled, in order to prevent gas development during the filling process. The extrusion press used for filling can easily be designed in such a way, e.g. by using heat-insulating materials, as to exclude detrimental effects on the outflow of plastic caused by the low temperature of the filling substance.

For the further perfection of the procedure of the invention the tube sections should preferably be marked by means of print, spraying, or labels, immediately after filling. Should printing be used, it will be necessary either to utilize the intermissions in the flow for the actual printing process, or to allow the printing device to move at the same speed as the flow of the tube. The same will be applicable to the stencils in the event of spraying. As for labelling, so-called sliding labels should preferably be applied, which can be used in connection with practically all plastics.

The plastic tube that is to take up the filling substance can be manufactured in any diameter desired. In particular, it will be possible to manufacture the tube in a diameter that allows for fitting the tube sections with a base or forming them in any other way so as to ensure stability in an upright position similar to cans and bottles. The invention also relates to arrangements designed to carry out the described process.

The characteristic feature of this arrangement is an extrusion press with a feeding nozzle, for the filling substance, located in the centre of the die, and with a system of sealing electrodes attached to it. If the manufactured plastic tube is to be expanded or bulged out by the filling substance, a guiding device for the tube must be attached to the die of the extrusion press. It is further advisable to attach a printing, spraying or labelling mechanism behind the system of sealing electrodes, if it is desired to mark the filled tube sections immediately after filling.

The above-mentioned stability of the filled tube sections can, in accordance with the invention, be effected by profiling the electrodes in such a manner that stability is ensured by the produced seam pattern. The seam can, for example, be designed in wavy or zigzag shape. It is also possible to design the electrodes of the sealing system as elements acting in radial direction and forming together a plane surface extending across the width of the tube. The electrodes can further be designed at an angle to the tube axis so as to form a conical or pyramidal shape of the seam in the sealing process.

Finally, the invention provides preferably for a cutting mechanism to be attached to the system of sealing electrodes, or to the marking mechanism respectively, and designed in accordance with the shape of the sealed seam and for cutting off filled tube sections. Such a cutting mechanism will be particularly advisable when, for the purpose of achieving stability of the tube sections, the seam is sealed in any shape other than straight.

The object of the invention is further explained by the attached drawing, which shows:

Fig. 1: a longitudinal section through an extrusion press in accordance with the invention;

Fig. 2: the cross-section of a system of sealing electrodes other than shown in Fig. 1;

Fig. 3: front view of an electrode system for making zigzag seams;

Fig. 4: front view of an electrode system for making a pyramid-shaped seam; and

Fig. 5: section of Fig. 4 along line V—V.

The extrusion press shown in Fig. 1 consists of a press frame 1 to which the feed pipe 3 with screw 2 for the thermoplastic substance is mounted, and which also contains the nozzle 4 for feeding the filling substance. The die 5 of the press and the front part of the conically shaped nozzle 4 form together an annular passage 6 through which the plastic is extruded in the form of a tube, thus encasing the filling substance fed through nozzle 4. The annular passage 6 and the nozzle 4 open into an enlarged cavity 7 of the press which allows the extruded plastic tube to be expanded to the diameter desired for packaging the filled tube. At the end of this cavity the electrodes 8 of a sealing system are mounted. They can be moved radially and serve to separate the filled tube into sections.

Fig. 2 illustrates a different design and arrangement of the electrodes 8, which possess wedge-shaped shoulders 8a and rest against similar wedge-shaped elements 7a, so that the electrodes, when closing, are simultaneously forced in the direction of flow of both tube and filling substance. The electrodes are held by springs 9 which force the electrodes back into the position shown, after the sealing process is completed. Fig. 3 shows the electrodes 8 with mutually complementary zigzag-shaped ends, forming a zigzag seam in the sealing process.

If the tube section, shown by a broken line circle in Fig. 3, is sealed into such a zigzag form, it possesses adequate stability to be handled in the same way as a can or bottle.

Another electrode system providing for stability of the tube sections is illustrated in Figs. 4 and 5. This electrode system consists of 4 electrodes 8b, each diametrically opposed pair having the same potential. Joined together these four electrodes 8b form a plane extending across the width of the tube sections. The seam produced by the electrodes 8b consists of four radial branches affording the tube sections adequate stability. The stability is even increased, if the electrodes, as shown in Fig. 5, are designed at a certain angle and move in the direction of this angle during the sealing process. In this case the four electrodes 8b form a pyramid and shape one end of the tube section into a concave pyramid, whereas the other end is slightly tapered in the form of a convex pyramid.

What is claimed is:

1. Apparatus for filling flowable material into thermoplastic expansible tubular containers comprising an extrusion die having a longitudinal central passage and a longitudinal annular passage coaxially about the central passage, a supply of the thermoplastic material for forming the tubular containers connected to the annular passage, a supply of flowable material connected to the central passage, means for continuously extruding the thermoplastic material and the filling material from adjacent ends of the central and annular passages, a tubular guide beyond the die in the direction of extrusion of a diameter in excess of the diameter of the annular passage and coaxial with the central passage of the die, the extruded tubular container expanding to the diameter of the tubular guide under the pressure of the extruded filling material, and a plurality of severing and welding electrodes at the open output end region of the tubular guide, the electrodes being movable radially inward to sever an expanded and fitted tubular container portion and seal the severed ends thereof to provide an elongated sealed container filled with the flowable material having upright stability when the container is placed on a severed and sealed end.

2. Apparatus according to claim 1 in which the plurality of severing and sealing electrodes is two in number disposed diametrically opposite each other, and each electrode is guided radially toward the other, the adjacent edges of the electrodes being tooth-shaped over an appreciable portion of the tubular container bottoms and interlocking with each other.

3. Apparatus according to claim 1 in which the electrodes of the plurality of severing and sealing electrodes are guided radially inward perpendicular to the longitudinal axis of the tubular container and together form a flat surface occupying the complete transverse cross-section of the expanded tubular container.

4. Apparatus according to claim 1 in which the electrodes of the plurality are guided radially inward at an angle acute to the longitudinal axis of the tubular container in the direction of extrusion of the container whereby on closure of the electrodes upon each other a dished bottom of the tubular container is obtained.

5. Apparatus according to claim 1 in which the electrodes are four in number arranged in two pairs of oppositely positioned electrodes so that on closure of both pairs on each other the tubular container is completely severed, an angular shoulder at the output end of the tubular guide for each electrode, a tapering surface on each electrode cooperating with a respective tubular guide angular shoulder to move each electrode in the direction of the extrusion of the tubular container on radially inward movement of the electrode, and a spring biased means for restoring the electrodes on radial outward movement of the electrodes.

References Cited in the file of this patent
UNITED STATES PATENTS

| | | |
|---|---|---|
| 2,199,425 | Waring | May 7, 1940 |
| 2,618,814 | Paton et al. | Nov. 25, 1952 |

FOREIGN PATENTS

| | | |
|---|---|---|
| 1,109,440 | France | June 25, 1954 |